(12) United States Patent
Ferron

(10) Patent No.: US 9,814,342 B2
(45) Date of Patent: Nov. 14, 2017

(54) VESSEL FOR COOKING FOOD FOR INDUCTION OR CONVENTIONAL SURFACES

(71) Applicant: BALLARINI PAOLO & FIGLI SPA, Rivarolo Mantovano (MN) (IT)

(72) Inventor: Jacopo Ferron, Casalmaggiore (IT)

(73) Assignee: BALLARINI PAOLO & FIGLI SPA, Rivarolo Mantovano (MN) (IT)

( * ) Notice: Subject to any disclaimer, the term of this patent is extended or adjusted under 35 U.S.C. 154(b) by 323 days.

(21) Appl. No.: 14/607,014

(22) Filed: Jan. 27, 2015

(65) Prior Publication Data

US 2015/0208846 A1 Jul. 30, 2015

(30) Foreign Application Priority Data

Jan. 30, 2014 (IT) .............................. MI2014A0127

(51) Int. Cl.
| | |
|---|---|
| *H05B 6/12* | (2006.01) |
| *A47J 36/02* | (2006.01) |
| *B65D 6/28* | (2006.01) |
| *A47J 27/00* | (2006.01) |
| *B21D 51/22* | (2006.01) |

(52) U.S. Cl.
CPC .............. *A47J 27/002* (2013.01); *A47J 36/02* (2013.01); *B21D 51/22* (2013.01); *Y10T 29/49938* (2015.01)

(58) Field of Classification Search
CPC ......... A47J 27/002; A47J 36/02; B21D 51/22; Y10T 29/49938
USPC ....... 219/621, 622, 623, 624, 620, 626, 627, 219/634, 660, 663, 665; 220/912, 926; 29/460, 505, 521, 514, 527.2; 126/215, 126/390; 99/331
See application file for complete search history.

(56) References Cited

U.S. PATENT DOCUMENTS

| | | | |
|---|---|---|---|
| 4,508,100 A * | 4/1985 | Deville ................... | A47J 36/02 126/390.1 |
| 5,430,928 A | 7/1995 | Flammang | |

(Continued)

FOREIGN PATENT DOCUMENTS

| | | | | |
|---|---|---|---|---|
| CN | 103505062 A | * | 1/2014 | .............. A47J 36/02 |
| EP | 0960667 A1 | | 12/1999 | |

OTHER PUBLICATIONS

Search Report and Written Opinion dated May 8, 2014 for Italian patent application No. MI20140127.

*Primary Examiner* — Quang Van
(74) *Attorney, Agent, or Firm* — Vorys, Sater, Seymour and Pease LLP

(57) ABSTRACT

A vessel for cooking food on induction or conventional surfaces, including a shaped body defining a surface that delimits a volume for containing a food, and a metal element, preferably ferromagnetic, arranged on the bottom of the vessel, the bottom having a plurality of first surfaces which define a support surface and a plurality of second surfaces recessed with respect to the support surface, the first and the second surfaces being interconnected by third surfaces tilted with respect to the support surface or perpendicular thereto, the ferritic plate/disc element having a plurality of holes filled with material constituting the body for the mutual fixing of the body to the plate/disc; at least one part of the holes is provided on at least one part of the third surfaces tilted with respect to the support surface.

21 Claims, 7 Drawing Sheets

(56) References Cited

U.S. PATENT DOCUMENTS 6,334,246 B1 1/2002 Marin
6,842,473 B2 * 1/2005 Porta .................. H01L 23/26
                                                          252/181.7

* cited by examiner

VESSEL FOR COOKING FOOD FOR INDUCTION OR CONVENTIONAL SURFACES

This claims the benefit of Italian patent application no. MI2014A00127, filed Jan. 30, 2014, incorporated herein by reference.

The present finding refers to a vessel for cooking food for conventional or induction surfaces, the latter being the main target of the invention.

Indeed, it is known that the aluminum cooking vessels are not suitable for use on induction cooking surfaces, given that such metal is non-magnetic and hence does not cause interferences with the magnetic flows created by the inductors of said cooking surfaces.

Only metals with ferromagnetic structure can interact with such magnetic flows.

Also austenitic stainless steels, such as nickel-chrome 18/10 stainless steel known as AISI 304, being non-magnetic, have a behavior analogous to aluminum.

In order to have magnetic interferences, ferrous material should be used; iron in particular is particularly suitable, like other carbon steels with ferritic structure.

A limit of these materials is that they rust, and thus are not really recommended for modern cooking practices, where water and detergents are used for cleaning utensils.

It is therefore necessary to use chrome stainless steels equipped with ferritic structure, of which the most well-known is called AISI 430.

Therefore, the technique used for making an aluminum cooking utensil for induction surfaces is that of coupling it with a ferritic stainless steel plate, positioned on the external bottom of the container.

Various techniques are used.

For example, a bimetallic ferritic stainless steel-aluminum material can be used. The ferritic stainless steel part is arranged outside the pot, the aluminum part inside the pot.

A second system provides for the application of a ferritic stainless steel disc/plate on the bottom of an aluminum pot, by means of braze welding with filler of special powder/paste generally with silver compound base.

The common disadvantage of such technologies is that they are rather costly and involve considerable hot deformations during cooking, of concavity of the bottoms, due to the voltages that are generated both in the hot braze welding process and due to the hot expansion difference of the aluminum body with respect to the steel plate, which due to its rigidity is not suitable for the greater expansion of the aluminum body: the expansion of aluminum is in fact two times greater than that of steel.

A third method consists of the technology known as "impact bonding". The pieces to be joined are previously heated to a suitable temperature, and then they are subjected to a strong, instantaneous pressure capable of constraining the two parts due to the friction between the two surfaces to be joined.

The limit of such technology is that it too is a hot application, with all the relevant consequences from a technical-productive standpoint, and in any case it does not solve the large deformation problems of the hot bottom during cooking. The lower expansion of steel with respect to aluminum (indeed, steel expands half as much) ensures that the interior of the pan is raised at the center with respect to the edges, causing the accumulation of the cooking oil towards the edges.

Another limit of this technology consists of the minimum thickness that the aluminum vessel must have.

Such characteristic limits the diffusion thereof in high-end items.

A further system provides for spraying, on the bottom of the aluminum pan, with plasma spray technology, thermal spray or cold spray of ferritic powders that constitute a layer sufficiently thick to confer magnetic strength properties.

Such solution has the disadvantage of being much slower and less productive, as well as more costly and hard to control with regard to thickness; it thus has application for small series and special products, due to its flexibility and applicability on surfaces that can even be quite large.

A further widespread method provides for the application of a perforated disc/plate made of ferritic stainless steel on an aluminum pot. This joining occurs by subjecting the two parts to be joined together to strong pressure, but at room temperature, in a manner such that the aluminum (which is the much more malleable of the two metals) penetrates into holes made on the ferritic stainless steel element and in a different manner operates with such filling the joining of the two parts. Upon completed joining, the holes have axis aligned with the axis of the pot.

In the field of such technology, mainly two families of solutions have been developed.

In the first solution family, flared perforations are executed which are able to retain the plate. Here the main defect is that the low thickness of the ferritic steel plate/disc has a hard time ensuring over time the fixing of the disc/plate at the aluminum bottom of the pot, due to the deformations caused by the different expansions of the two metals in contact (i.e. the steel expands half as much as the aluminum).

These different movements of the metals in contact over time end up breaking the bond that was originally present.

In the second solution family, the fixing to the aluminum bottom of the pot is ensured by the riveting of the aluminum that exited from the holes, in a manner such that a rivet-like head is formed.

The riveted aluminum solves the limits of the preceding solution, but its application in the high-performance solutions requires more complex and costly tools and processes, justifiable in large production series.

The greater complexity of the process is due to the fact that the perforated plate/disc must be mutually aligned with the mold that operates thereon in order to rivet the aluminum projecting from the holes.

U.S. Pat. No. 5,430,928 relates to a cooking vessel comprising a perforated plate made in a hard metal (such as steel) coupled by cold closed die forging with the bottom of a shaped aluminum cooking body such as portions of the metal of said bottom penetrate in holes of said plate. The holes of the plate are dimensioned such as during the forging process the portions of the bottom which penetrates in a same hole of the plate create in this same hole: first surfaces defining a support surface for the cooking vessel, second surfaces defining second surfaces recessed with respect to the first surfaces, and third surfaces inclined or perpendicular to said support surface. As the three surfaces which are formed extend all three in the same hole of the plate, the cooking vessel has the same drawbacks disclosed before with reference to the cold joining with a strong pressure of the perforated metal plate and an aluminum cooking body, and in particular the same drawbacks related to a non reliable and non durable connection of these plate and body.

Object of the present finding is therefore to obtain a vessel for cooking food for conventional or induction cooking surfaces that overcomes the drawbacks and limits of the prior art.

A further object of the finding is to provide a vessel with a plate made of ferromagnetic material firmly locked over time with the rest of the vessel made of another material, preferably aluminum, and which is inexpensive in the production thereof, geometrically more flexible and with advantageous costs.

These and other objects are achieved by obtaining a vessel according to the technical teachings of the enclosed claims.

Further characteristics and advantages of the finding will be evident from the description of a preferred but not exclusive embodiment of the vessel, illustrated as a non-limiting example in the enclosed drawings, in which.

With reference to the abovementioned figures, a vessel for cooking food on induction or conventional surfaces is shown overall with the reference number 1.

The vessel 1 comprises a shaped body 2 provided with a surface that defines a volume for containing food, during cooking.

It is preferably made of aluminum or another malleable material suitable for cooking.

As known, aluminum is not suitable for use on induction surfaces. It is in fact non-magnetic.

Preferably the body 2 is realized in a non magnetic material.

Therefore, in order to make the vessel usable also on such surfaces, the shaped body is coupled to a metal element 3 preferably made of a ferromagnetic material (e.g. ferritic stainless steel) arranged on the bottom of the vessel.

Figure 3:
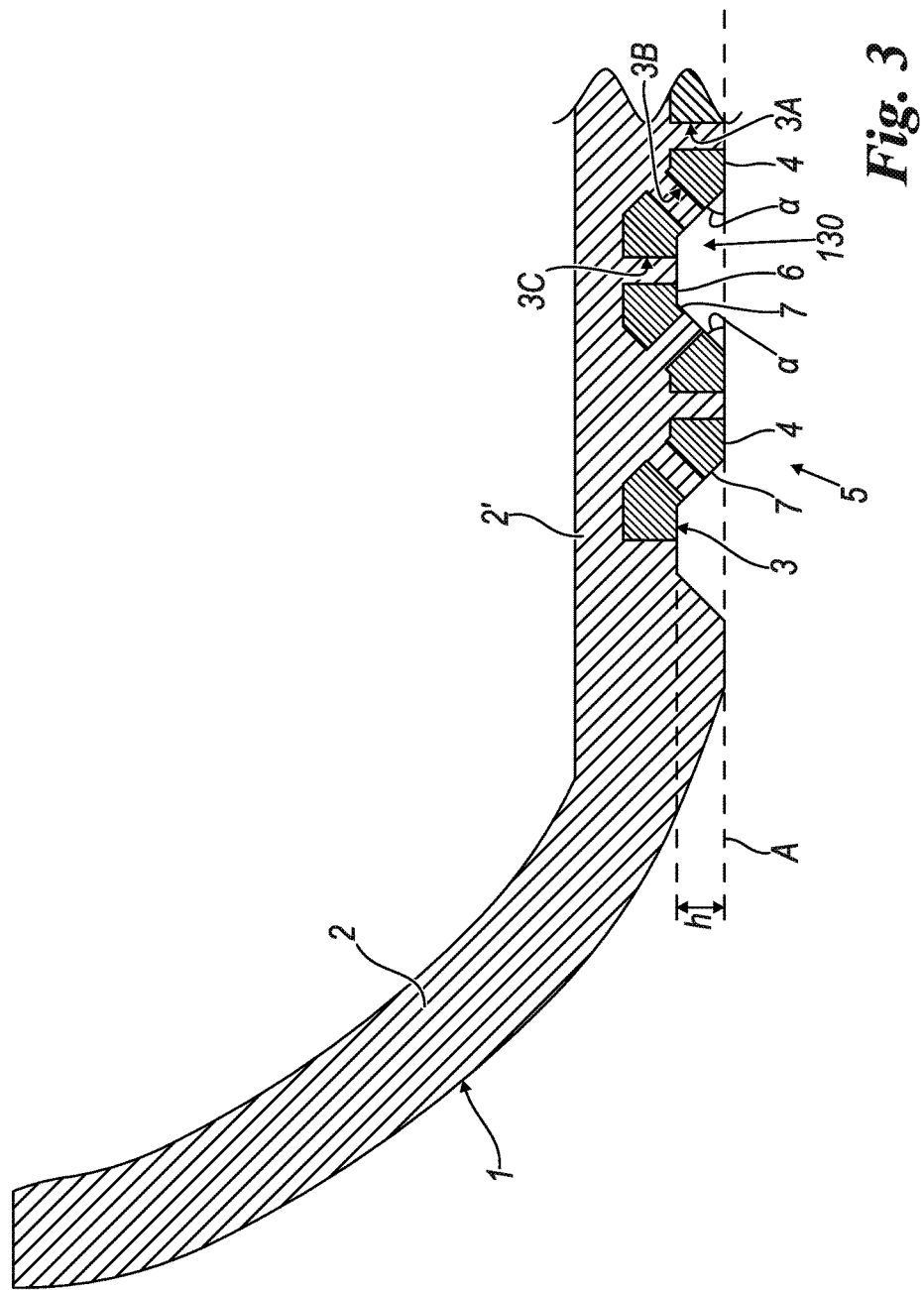
FIG. 3 is an enlarged partial section of a container according to the present finding.
Figure 4:
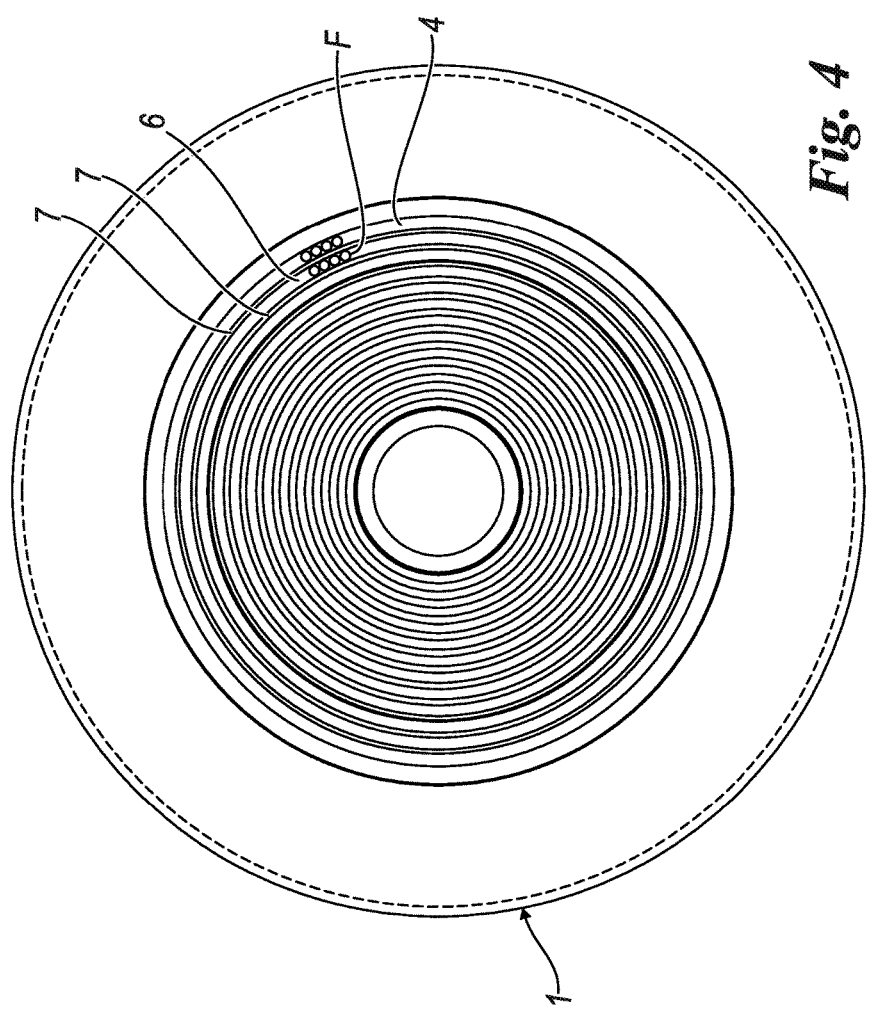
FIG. 4 is a bottom view of the container of FIG. 3.

As can be observed in particular in FIG. 3, the bottom 5 of said vessel 1 has a plurality of first surfaces 4 which define a support surface A for the vessel itself. In addition, the bottom 5 has a plurality of second surfaces 6 that are recessed with respect to the support surface A. Such surfaces actually lie at a distance "h" (FIG. 3) from the support surface. It should be observed that the distance of the second surfaces from the support surface A (i.e. from the first surfaces) can always be the same, or it can be different depending on the part of the bottom where it is situated. Advantageously such distance h between the second surfaces 6 and the first surfaces 4 is conveniently less than 2 mm.

The first and the second surfaces are interconnected by third surfaces 7 that are tilted with respect to the support surface A. Advantageously the angle α between the surface and the support surface is 90° or as close as possible to 90°, even if in the drawing, for description purposes, it is less accentuated. In any case, it can be advantageously comprised between 60° and 90° degrees.

The metal element 3, upon completed coupling, presents itself as a shaped plate 3 provided with a plurality of holes 3A-3C filled with material constituting said shaped body for the mutual fixing of the body to the element itself.

Given that the holes are preferably distributed in a uniform manner over the entire surface of the plate, it is observed that they are present both on the first surfaces 4 and on the second surfaces, as well as on the third surfaces 7.

It follows that the holes arranged on the third surfaces 7 (the tilted surfaces) of the shaped walls are substantially parallel to the support surface or have incident axis with respect to the latter with an angle that ranges from slightly over 0° (parallel or nearly so) to 30° or more degrees.

Figure 5:
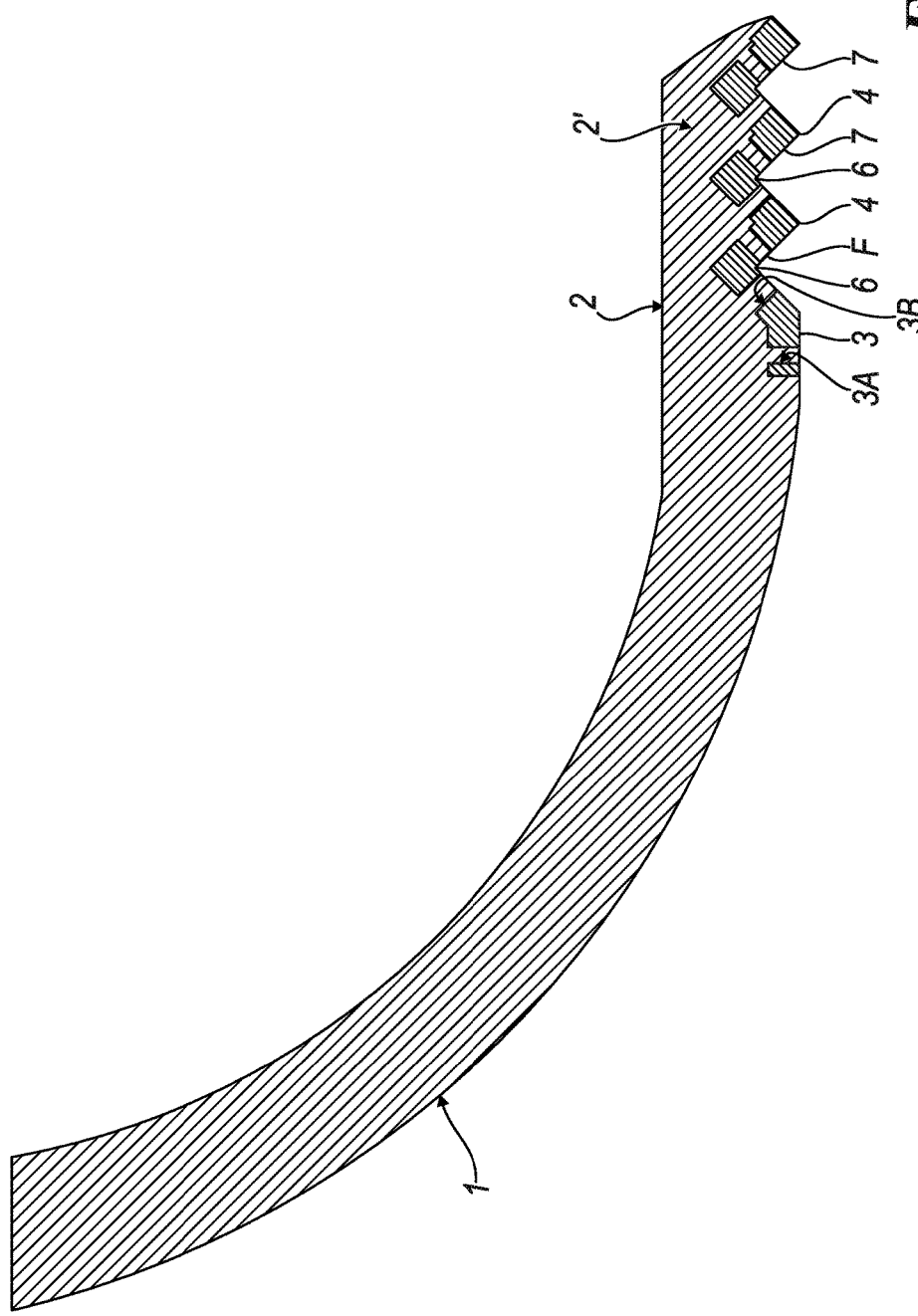
FIG. 5 is a partial section view of a different embodiment of the present finding.
Figure 6:
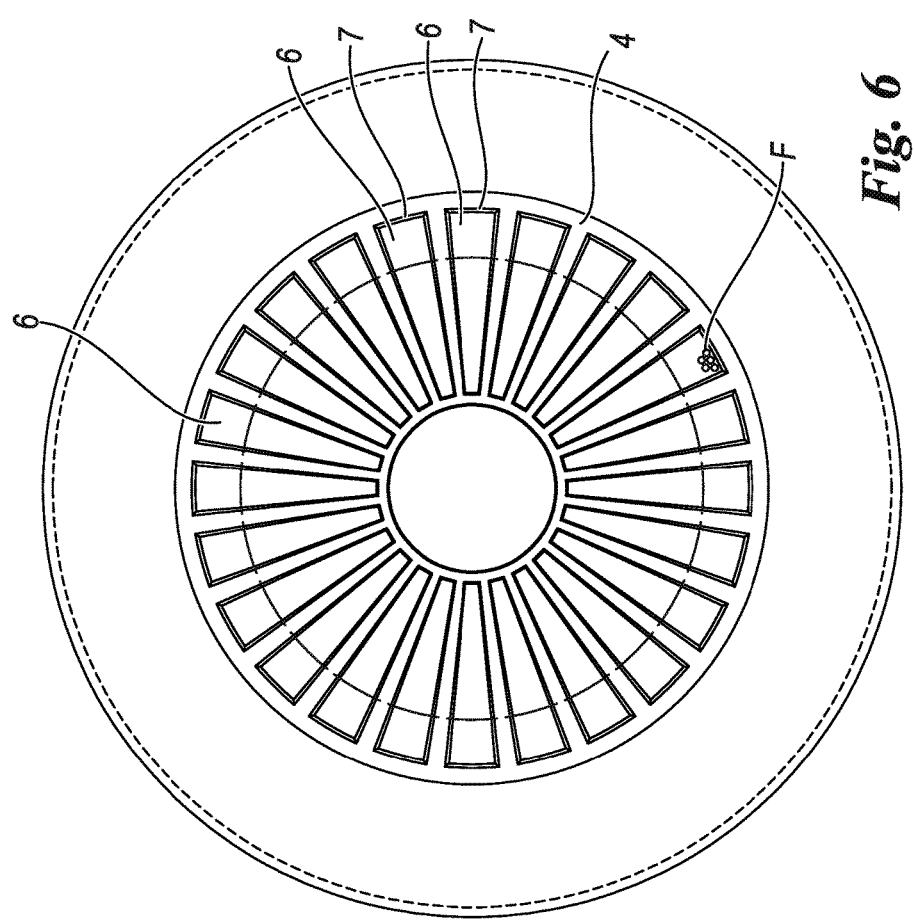
FIGS. 6 and 7 are bottom views of different embodiments of the container of the present invention.
Figure 7:
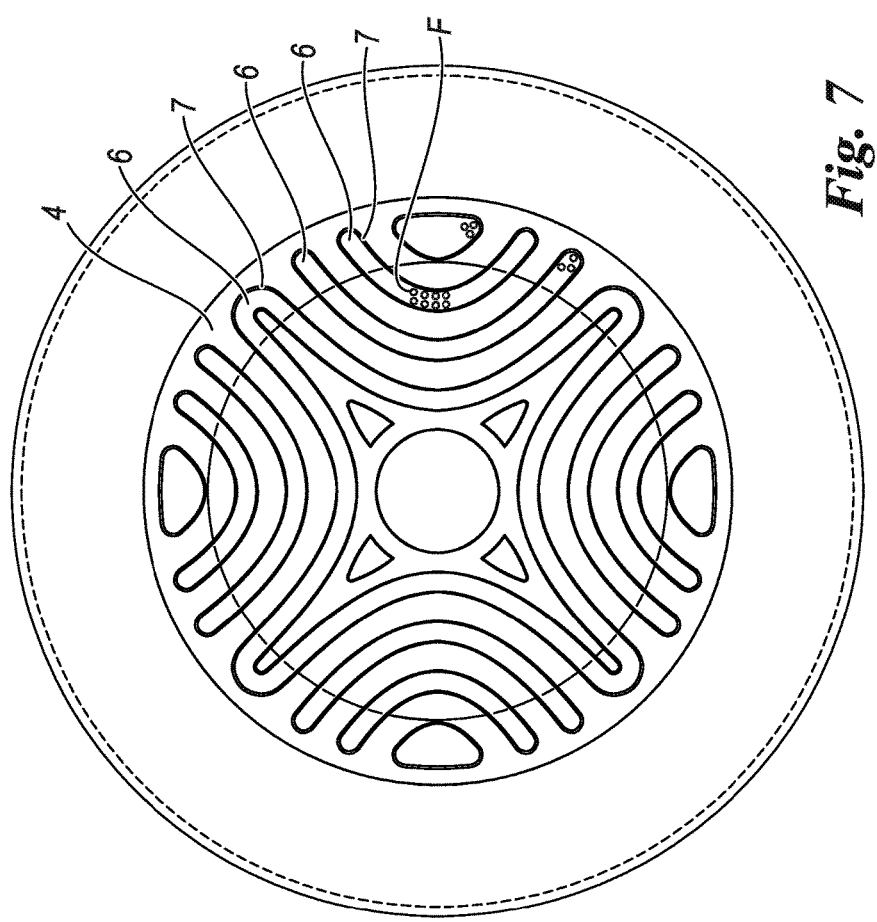

As clearly visible in FIGS. 3 and 5 once the metal element 3 and the bottom 5 of the shaped body 2 are coupled at least a plurality of holes 3A-C of the metal element 3 are provided and extend only in portions of the third surfaces 7 tilted or perpendicular to the support surface A of the vessel.

In this way the cooking vessel comprises holes 3B filled with material forming the bottom of the shaped body 2 which extend totally and only in portions of the third surfaces 7.

From the drawings it is also visible that once the metal element 3 and the shaped body 2 are coupled at least a plurality of holes 3A-C of the meal element 3 are provided and extend only in portions of the first surfaces 4 defining the support surface A. In this way the cooking vessel comprises holes 3A filled with material forming the bottom of the shaped body 2 which extend totally and only in portions of the first surfaces 4.

From the drawings it is also visible that once the metal element 3 and the shaped body 2 are coupled at least a plurality of holes 3A-C of the meal element 3 are provided and extend only in portions of the second surfaces 6 recessed with respect to the first surfaces 4. In this way the cooking vessel comprises holes 3A filled with material forming the bottom of the shaped body 2 which extend totally and only in portions of the second surfaces 6.

In particular it is observed that, given the same distance "h" between the first 4 and second 6 surfaces, if the third surfaces 7 are perpendicular to the first and second surfaces there would be a shape with a lower number of holes affected by the filling but very effective in resisting separation; in the case of smaller tilt angles, e.g. 45°, there will be more holes affected by the filling due to the increase with the third surfaces: the seal on one hand is reduced and on the other increases due to the greater number of holes involved.

If the holes F were only present on the first surfaces 4 and/or on the second surfaces 6, which are substantially parallel to the support surface, a force that acts on the metal element or plate 4 normal to the support surface A and in the direction moving away from the shaped body 2, could lead to the separation of plate and shaped body.

Indeed, there is no other force beyond that deriving from the friction between that material portion of the shaped body within the holes and the surface of the plate defining the holes themselves, which would prevent the separation of the two parts.

According to the present finding, the presence of holes 3B filled with material of the shaped body, in the third surfaces 7 as well (or only herein) which are recessed and tilted with respect to the support surface A, allows effectively opposing any force of separation between plate and shaped body. This ensures a very long lifetime to the container, even when subjected to the physiological cycles of heating and (often sudden) cooling, to which such containers are subjected during the use thereof.

Given that the second 6 and third 7 surfaces are not in contact with the cooking surface, they can conveniently be painted a dark color or the like in order to increase the infrared radiation thermal absorption properties of the conventional halogen ceramic glass surfaces or electric heating surfaces.

In addition to this technical benefit, the use of this measure allows obtaining particular aesthetic finishes deriving from the fact that the second 6 and third 7 surfaces are covered with a layer of paint (which can be of any color), while said first surfaces 4 preferably lack color; the paint is in fact easily removable from the first surfaces with simple mechanical grinding processing.

Figure 1:
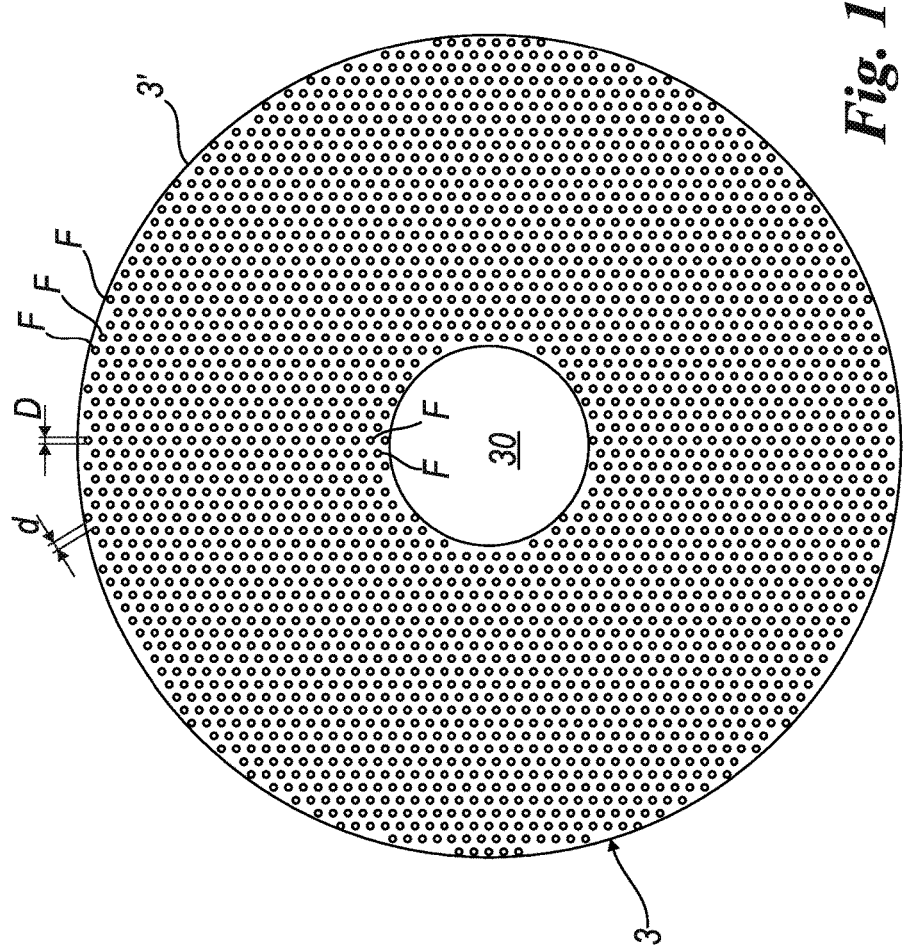
FIG. 1 is a plan view of a plate/disc to be fixed to the vessel of the present finding, before it is fixed to the vessel itself.
Figure 2:
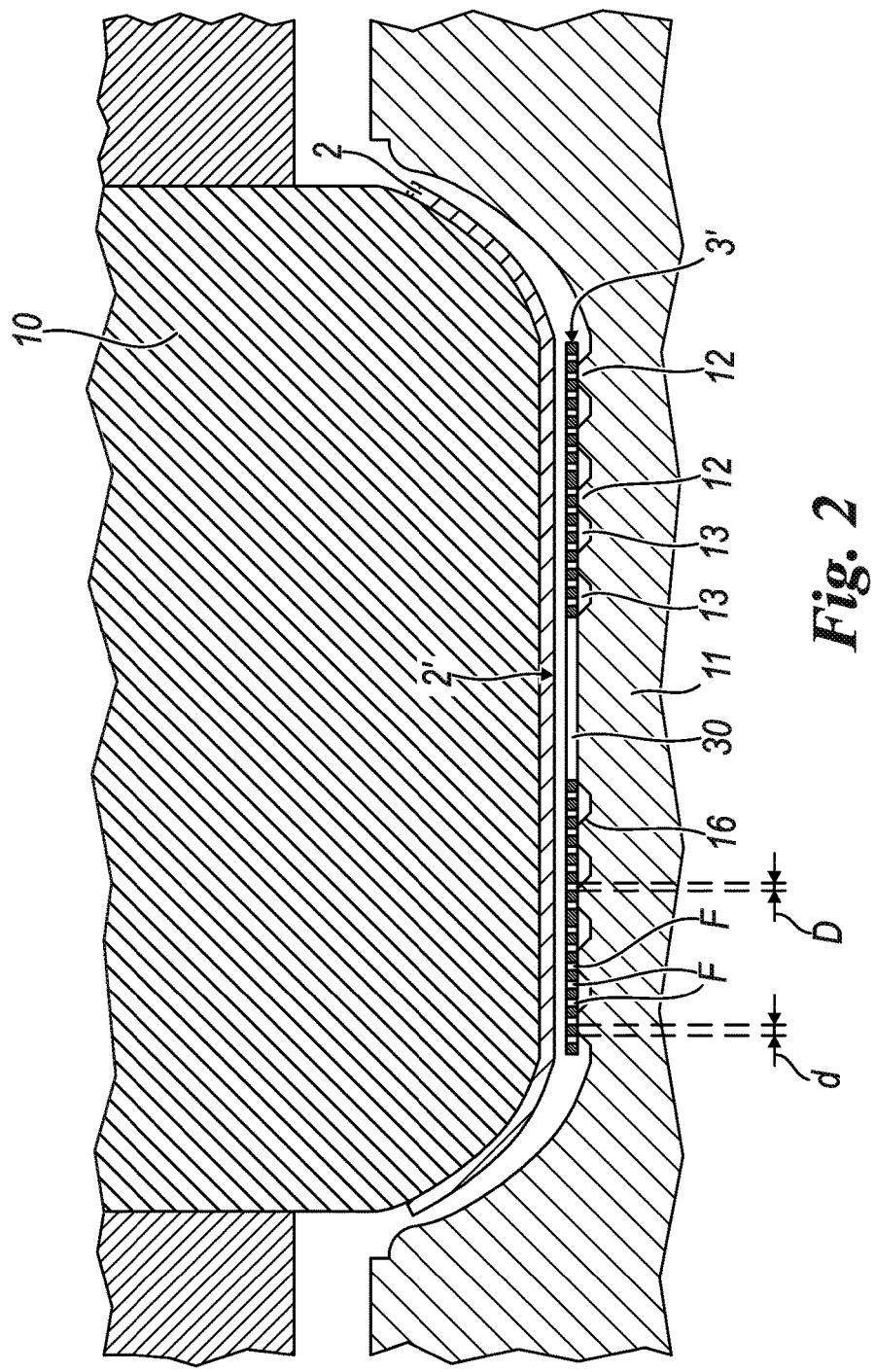
FIG. 2 is a simplified side section view of a step of coupling the plate/disc of FIG. 1 to the container.

As seen in FIG. 2, the metal element 3 is preferably made of a single flat plate 3' (which is shaped after application) or micro-perforated disc, made of ferritic steel.

This plate/disc 3' can be obtained directly from a commercial micro-perforated sheet metal that can be easily found on the market; this is useful practice, above all if working with items of limited series and/or special developments.

The plates/discs thus obtained can be recognized due to the fact that they have non-continuous cutting perimeters.

In the cases of larger series, it may be advantageous to directly produce the micro-perforated discs/plates by using more productive and competitive techniques based on micro-perforation and cutting of continuous strip, which has a continuous cutting perimeter.

Further advantage of such process is that it allows obtaining, at the center of the plate/disc, a central hole 30 usable as a window for affixing, to the aluminum body, logos or trademarks impressed directly on the body itself.

The central hole 30 thus obtained can conveniently act as a centering element in the coupling of the pieces inside the pressing mold.

The holes F (FIG. 2) made in said ferritic disc/plate 3' have a diameter "D" advantageously comprised between 1 mm and 2 mm.

Advantageously, before the deformation of the plate or in a non-deformed zone thereof (e.g. on the first 4 or second 6 surfaces), two adjacent holes have a distance "d" between them comprised between 2 mm and 4 mm.

In particular, the holes F, before deformation, are uniformly distributed on the plate and have a density ranging from 5 to 10 holes per $cm^2$.

The method for obtaining a cooking vessel according to the finding is described hereinbelow and can be easily understood from the analysis of FIG. 2.

In substance, an aluminum disc or a bottom 2' of the shaped body 2 and a ferromagnetic material plate are cold pressed in a single stroke (or in subsequent steps), mutually centered between punch 10 and mold 11; such ferromagnetic material plate 3' is preferably made of ferritic steel material and has a plurality of holes F with the above-described characteristics. The mold 11 provides for reliefs 12 and cavities 13 adapted to create a plurality of recesses 130 (FIG. 3) in the disc/plate and in the shaped body.

After the pressing on the bottom, first surfaces 4 are formed that derive from the pressing against the base of the cavities 13, second surfaces 6 are formed that derive from the pressing against the crests of the reliefs 12, and third surfaces 7 are formed due to the pressing (or sliding) of the lateral surfaces 16 of the reliefs.

During the pressing, the material that forms the bottom 2' of the shaped body 2 penetrates into the holes F which during deformation come to be positioned at said third surfaces 7.

During pressing, of course, the material of the shaped body also penetrates into the holes arranged at the first and second surfaces 4 and 6.

The penetration of the material constituting the shaped body 2 especially within the holes 3B of said third surfaces 7 makes a perfect and indissoluble joining of the ferritic element with the body of the cooking vessel.

In substance, the axial seal of the tie is ensured by the filling of the holes 3B on the third surfaces 7, which are situated orthogonally (or nearly so) to the axis of the pot.

With regard to the cavities 130 present in the bottom (and consequently with regard to the reliefs 12 present in the mold), these can have particular patterns. The multiplicity of shapes of the impressions (i.e. of the reliefs) that can be employed provides various possibilities for personalization of the containers.

FIGS. 4-7 are only a few examples of the many that can be attained. It is observed that for the sake of simplicity, only some of the innumerable holes F, present on the bottom of the vessels, were indicated in the drawings.

It is observed that the particular final configuration of the plate on two different levels constituted by the first and second surfaces involves a shape flexibility that damps the deformation forces that are developed in hot conditions, in such a manner considerably limiting the bending of the pot bottom, not least object of the finding.

A possible and advantageous variant is that of deforming, during pressing, the ferritic ring-shaped disc/plate with triangular section, as is clearly seen in FIG. 5. In such embodiment the first surfaces 4 and the second surfaces 6, in the middle part of the container, are substantially reduced to circumferences.

A similar application proposes an important benefit; the particular "accordion" shape allows great flexibility and an easy adaption to the deformation: therefore, when the aluminum bottom is thermally expanded, it drives, due to the acquired shape flexibility, also the ferritic disc/plate (or coating), thus considerably improving the solidity of the container.

In the above description, there was particular focus on the presence of a metal element arranged on the bottom of the container, and on its method of fixing, in order to render the container suitable for cooking on induction surfaces as well.

It should be stated, though, that the metal element fixed to the shaped body can also be made of a non-ferromagnetic metal.

In this case, the presence of the metal element is explained by the need to have a protection element for the shaped body 2, perhaps made of a material more resistant to impact or less subject to abrasion and scratches, in order to make the bottom of the vessel strong and durable. In addition, the metal element (made of non-ferromagnetic material) can improve the characteristics of contact with the glass ceramic surfaces of the electric surfaces.

In substance, in such case the metal element (or plate) may not be made of ferromagnetic steel and the above-described application does not lose the described sealing and stability characteristics with respect to the other technologies used for joining the two parts.

Different embodiments have been described, but others can be conceived by exploiting the same innovative concept.

The invention claimed is:

1. A vessel for cooking food on induction or conventional surfaces, comprising
    a shaped body with a surface that defines a volume for containing food during cooking, and
    a metal element applied onto the bottom of the vessel,
    the bottom of the vessel having a plurality of first surfaces that define a support surface and a plurality of second surfaces recessed with respect to the support surface, the first and the second surfaces being interconnected by third surfaces tilted or perpendicular with respect to the support surface, the metal element having a plurality of filled holes extending through the metal element, the filled holes filled with material of the shaped body for the mutual fixing of the shaped body to the metal element, wherein at least a first plurality of the filled holes is provided only on at least a portion of the third surfaces, the first plurality of filled holes extending totally and only inwardly from the third surfaces, wherein exposed surfaces of the first plurality of filled holes are located entirely within the third surfaces.

2. The vessel according to claim 1, wherein a second plurality of the filled holes is provided only on the first surfaces, wherein exposed surfaces of the second plurality of filled holes are located entirely within the first surfaces.

3. The vessel according to claim 1, wherein a paint layer is applied on at least said second and third surfaces.

4. The vessel according to claim 1, wherein the metal element is made of a ferromagnetic material.

5. The vessel according to claim 1, wherein the holes of the metal element are round holes having a diameter between 1 mm and 2 mm.

6. The vessel according to claim 2, wherein on the first and/or second surface, said exposed surfaces of two adjacent filled holes have a distance between them of between 2 mm and 4 mm.

7. The vessel according to claim 1, wherein the distance between the exposed surfaces of said second surfaces and said first surfaces is less than or equal to 2 mm.

8. The vessel according to claim 1, wherein the filled holes of said metal element have a density of 5 to 10 holes per $cm^2$.

9. The vessel according to claim 1, wherein the bottom of the vessel has a plurality of ring-shaped recesses with triangular shaped sections.

10. A method for obtaining a cooking vessel of claim 1 for conventional or induction surfaces comprising the steps of:
cold pressing a shaped body and a metal element having a plurality of holes against a surface of a mold presenting reliefs adapted to create, in the metal element and in the shaped body,
a plurality of first surfaces which define a support surface for the vessel,
a plurality of second surfaces recessed with respect to said support surface, and
a plurality of third surfaces tilted or perpendicular with respect to the support surface which interconnect the first and the second surfaces,
to make the material of the shaped body penetrate into and fill a first plurality of the holes positioned at the third surfaces to be only on at least a portion of the third surfaces, such that the first plurality of filled holes extends totally and only inwardly from the third surfaces to have exposed surfaces having perimeters located entirely within the third surfaces.

11. The vessel according to claim 1, wherein the metal element is obtained directly by means of cutting from micro-perforated sheet metal.

12. The method according to claim 10, wherein the metal element is obtained directly by cutting from micro-perforated sheet metal.

13. The method according to claim 10, wherein the metal element is made of ferromagnetic material.

14. The vessel according to claim 1, wherein a second plurality of the filled holes is provided only on the second surfaces, such that exposed surfaces of the second plurality of filled holes are located entirely within the second surfaces.

15. A vessel for cooking food on induction or conventional surfaces, comprising
a shaped body defining a volume for containing food during cooking, and
a metal plate applied onto a bottom of said shaped vessel together forming a bottom surface of the vessel,
the bottom surface of the vessel having a plurality of first surfaces defining a support surface and a plurality of second surfaces recessed with respect to the support surface,
the first and said second surfaces being interconnected by third surfaces tilted or perpendicular with respect to the support surface,
the metal plate having a plurality of filled holes extending through a thickness of the metal plate and containing material extending from the shaped body connecting the shaped body and the metal plate together,
wherein outer dimensions or perimeters of exposed surfaces of the filled through holes located on the bottom surface of the vessel bottom are each located entirely within boundaries or edges of bottom surface portions of the vessel defining and encompassing the first surfaces, second surfaces, and third surfaces.

16. The vessel according to claim 15, wherein the perimeters of the exposed surfaces of the filled holes are located entirely within at least the third surfaces.

17. The vessel according to claim 15, wherein the filled holes have diameters less than dimensions of the boundaries or edges of the first surfaces, second surfaces, and third surfaces so that the filled holes can be located entirely within same.

18. The vessel according to claim 17, wherein said perimeters of the exposed surfaces of the filled holes are spaced apart a distance from the boundaries or edges of the first surfaces, second surfaces, and third surfaces.

19. The vessel according to claim 1, wherein the exposed surfaces of the filled holes are not located on boundaries or edges defining the first surfaces, second surfaces, and third surfaces.

20. The vessel according to claim 14, wherein the exposed surfaces of the filled holes are not located on the boundaries or edges defining the first surfaces, second surfaces, and third surfaces.

21. The vessel according to claim 1, wherein shape of the bottom of the vessel presents the third surfaces two by two facing each other.

* * * * *